United States Patent
Cleveland et al.

(10) Patent No.: US 8,228,792 B2
(45) Date of Patent: Jul. 24, 2012

(54) METHODS, SYSTEMS, AND COMPUTER PROGRAM PRODUCTS FOR PROVIDING MESSAGE FLOW CONTROL BETWEEN APPLICATIONS IN A TELECOMMUNICATIONS SIGNALING MESSAGE ROUTING PLATFORM HAVING A DISTRIBUTED INTERNAL PROCESSING ARCHITECTURE

(75) Inventors: Kurt Cleveland, Raleigh, NC (US); Robert L. Wallace, Apex, NC (US); D. Bruce Ledet, Wake Forest, NC (US)

(73) Assignee: Tekelec, Inc., Morrisville, NC (US)

( * ) Notice: Subject to any disclaimer, the term of this patent is extended or adjusted under 35 U.S.C. 154(b) by 1232 days.

(21) Appl. No.: 11/972,210

(22) Filed: Jan. 10, 2008

(65) Prior Publication Data
US 2009/0080638 A1    Mar. 26, 2009

Related U.S. Application Data

(60) Provisional application No. 60/995,204, filed on Sep. 25, 2007.

(51) Int. Cl.
*H04J 1/16* (2006.01)
*H04L 12/56* (2006.01)

(52) U.S. Cl. ......... 370/230; 370/252; 370/389; 370/412

(58) Field of Classification Search .................. 370/230, 370/252, 389, 412
See application file for complete search history.

(56) References Cited

U.S. PATENT DOCUMENTS
2001/0034791 A1* 10/2001 Clubb et al. .................. 709/238
2002/0095399 A1* 7/2002 Devine et al. .................... 707/1

OTHER PUBLICATIONS

Tekelec, "Eagle STP, ANSI-ITU Gateway Feature," Tekelec Network Switching Division, Publication 908-0133-01, Rev. B 0297-2500 (1997).

* cited by examiner

*Primary Examiner* — John Pezzlo
(74) *Attorney, Agent, or Firm* — Jenkins, Wilson, Taylor & Hunt, P.A.

(57) ABSTRACT

Methods, systems, and computer program products for providing message flow control in a signal transfer point are described. One method includes receiving, at a source card in a signaling message routing platform having a distributed internal processing architecture, a message requiring a service. The method also includes maintaining, on the source card, a local memory table containing a list of service cards and corresponding flow control status of each service card. The local memory table on the source card is also queried to select a service card capable of performing the service. The message is transmitted to one of the service cards with an available flow control status.

25 Claims, 5 Drawing Sheets

METHODS, SYSTEMS, AND COMPUTER PROGRAM PRODUCTS FOR PROVIDING MESSAGE FLOW CONTROL BETWEEN APPLICATIONS IN A TELECOMMUNICATIONS SIGNALING MESSAGE ROUTING PLATFORM HAVING A DISTRIBUTED INTERNAL PROCESSING ARCHITECTURE

RELATED APPLICATIONS

The presently disclosed subject matter claims the benefit of U.S. Provisional patent application Ser. No. 60/995,204, filed Sep. 25, 2007; the disclosure of which is incorporated herein by reference in its entirety.

TECHNICAL FIELD

The present subject matter relates to providing flow control between applications in a telecommunications signaling message routing platform having a distributed internal processing architecture. More particularly, the present subject matter relates to methods and systems for providing message flow control between applications in a telecommunications signaling message routing platform having a distributed internal processing architecture.

BACKGROUND

In a common channel signaling network, such as an SS7 network, call signaling messages are used to set up and tear down calls between end users and to communicate with databases. These call signaling messages are sent over signaling links to a signaling node that routes the call signaling messages to the appropriate destination. The signaling links can be SS7 signaling links, IP signaling links, or other signaling links suitable for carrying call signaling messages associated with a call session. The node that conventionally routes signaling messages between such signaling links is referred to as a signal transfer point (STP). In non-SS7 networking environments, such as session initiation protocol (SIP)-based networking environments, routing may be performed by a SIP gateway server, SIP server, a SIP router, an IP Multimedia Subsystem (IMS) call session control function (CSCF) server, or other SIP-capable network element.

In addition to routing call signaling messages between signaling links, STPs may be responsible for providing various services, such as LNP or GTT translations for call signaling messages. In one example, an STP receives a call signaling message originating from an end office or SSP via a signaling link. The signaling link is coupled to a source card that resides within the STP. The source card inspects the message, determines the services (if any) that need to be provided for the message. The source card may send the message to a service card to provide the service(s). In one example, if the service is GTT, the service card may perform the GTT lookup, insert the new point code and subsystem number in the message, and route the message to its destination. If the provided service is LNP, the service card may perform an LNP lookup and respond to the LNP query with a local routing number (LRN) associated with the switching point (SP) to which the subscriber has been ported.

Because of the distributed nature of the source cards and the service cards in telecommunications signaling platforms, it is necessary for a flow control mechanism to exist between the source cards and the service cards to prevent source cards from overwhelming service cards. One conventional flow control mechanism used in the EAGLE® signal transfer point commercially available from the assignee of the present subject matter is referred to as ticket voucher flow control. According to ticket voucher flow control, when a source card receives a message that requires service, the source card launches a ticket voucher request message containing an indicator of the requested service type. The ticket voucher request message flows through all of the service cards. The first service card that receives the ticket voucher request message that is capable of providing the requested service type modifies the message to change it into a ticket voucher grant message, decrements its capacity corresponding to the amount of work required to provide the service, and returns the grant to the source card. The source card then sends the message to the grantor.

One problem with the existing ticket voucher flow control mechanism is that it does not provide information of the full rated capacity of each service card. All that the source card knows is that there is at least one card that can process the message. Another problem with the existing ticket voucher flow control mechanism is that it relies on the cards being arranged in a ring topology. The grant passes through all of the cards in the ring before being transferred back to the source. It may be desirable to configure the source cards and the service cards in a star topology via a switch. In such a topology, some messages may bypass some cards, which will require modification to the existing ticket voucher flow control mechanism.

Accordingly, there exists a long-felt need for improved methods, systems, and computer program products for providing message flow control between applications in a telecommunications signaling message routing platform having a distributed internal processing architecture.

SUMMARY

According to one aspect, the subject matter described herein comprises methods, systems, and computer program products for providing message flow control in a communications network routing element, such as an SS7 signal transfer point. One method includes receiving, at a source card in a signaling message routing platform having a distributed internal processing architecture, a message requiring a service. The method also includes maintaining, on the source card, a local memory table containing a list of service cards and corresponding flow control status of each service card. The local memory table is also queried to select a service card capable of performing the service. The message is transmitted to one of the service cards with an available flow control status.

The subject matter described herein for providing a message flow control in a telecommunications signaling message routing platform having a distributed internal processing architecture may be implemented using a computer program product comprising computer executable instructions embodied in a computer readable medium that are executed by a processor. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

The subject matter described herein relates to methods, systems, and computer program products for providing message flow control in a telecommunications signaling platform having a distributed internal processing architecture. Examples of telecommunications signaling message routing platforms in which the present subject matter can be implemented include SS7 signal transfer points, with or without SS7/IP functionality, SIP signaling routers, IMS CSCF entities, or any other telecommunications signaling message routing platform where telecommunications signaling messages are received, services are provided for some of the messages, and the original messages or responses to the original messages are routed.

Figure 1:
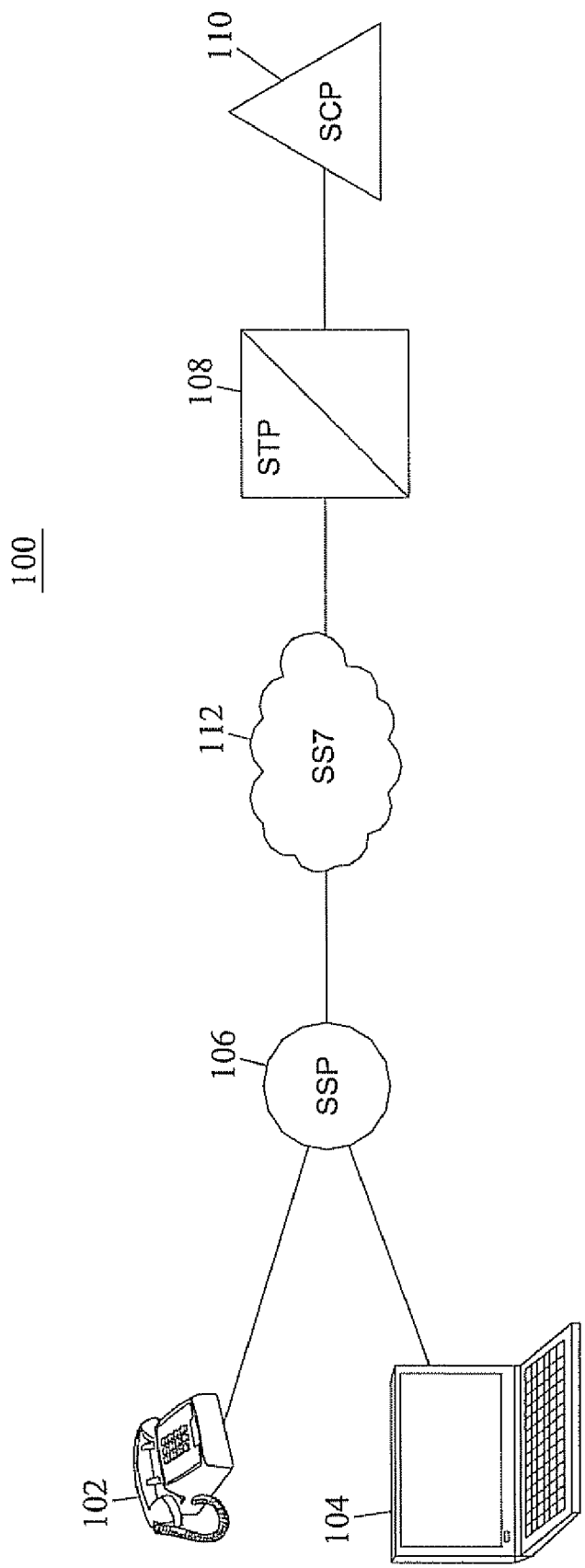
FIG. 1 is an exemplary communications network that includes a telecommunications signaling message routing platform having a distributed internal processing architecture for providing message flow control between applications in the platform according to an embodiment of the subject matter described herein.

Shown in FIG. 1 is a simplified communications network scenario that includes a Signaling System 7 (SS7) communications network, generally indicated by reference numeral 100. Network 100 may include both a conventional voice type calling party 102 and a computer terminal based data type calling party 104. Both calling devices are communicatively coupled to an originating end office (EO) or service switching point (SSP) 106. In one embodiment, SSP 106 may be a "Class 5 switch" or "TDM switch," or any other network device specialized for TDM-based, circuit-switched telephone calls. In another scenario, SSP 106 may include a packet switch, a softswitch, media gateway and/or media gateway controller functionality for establishing communications sessions over a packet switched network. In the illustrated example, SSP 106 is generally connected via an SS7 network 112 to at least one SS7 signaling message routing node, such as signal transfer point (STP) 108 or any other signaling message routing node. Coupled to STP 108 is a service control point (SCP) 110. SCP 110 may include an 800 number database, a line information database (LIDB), local number portability (LNP) database, or other database services typically associated with the public switched telephone network (PSTN) or a VoIP network. Although STP 108 in FIG. 1 is shown to include a limited number of signaling links and connections, it is appreciated that the present subject matter is not restricted to communicating with only these signaling nodes using a single STP node. The signaling nodes and signaling links depicted in FIG. 1 are shown for illustrative purposes only.

In FIG. 1, STP 108 receives a call signaling message from SSP 106 (in response to a call or like communications transaction placed by client device 102 or 104 that is initially received by SSP 106). The call signaling message may be any suitable signaling message for setting up a call. For example, if the call is set up using a TDM based SS7 signaling link, the call signaling message may be an ISDN user part (ISUP) Initial Address Message (IAM) message. If the call is being set up via VoIP network, the signaling message may be a SIP invite message. In addition to call set up signaling messages, a signaling message may be a non-call related message, such as a Transaction Capabilities Application Part (TCAP) or SIP query to SCP 110.

In response to receiving the signaling message, STP 108 may either route the signaling message or may provide a service for the signaling message. As stated above, some types of services that are provided by STPs include LNP translation, global title translation, security screening, call redirection, or any other database related service that may be provided for a signaling message. In one embodiment, STP 108 may include a distributed internal processing architecture in which the functionality for receiving signaling messages is distributed over various source cards and the functionality for providing services for signaling messages is distributed over various service cards. In such an architecture, plural service cards may be provisioned to provide the same services and any one of the source cards may contact any one of the service cards for providing service to signaling messages received by the source cards. In addition, a single service card may not be capable of simultaneously providing service for all of the source cards. Accordingly, there exists a need for efficiently providing message flow control between source cards and service cards. In addition, there also exists a need for providing system level flow control for system level messages, such as network management messages.

Figure 2A:
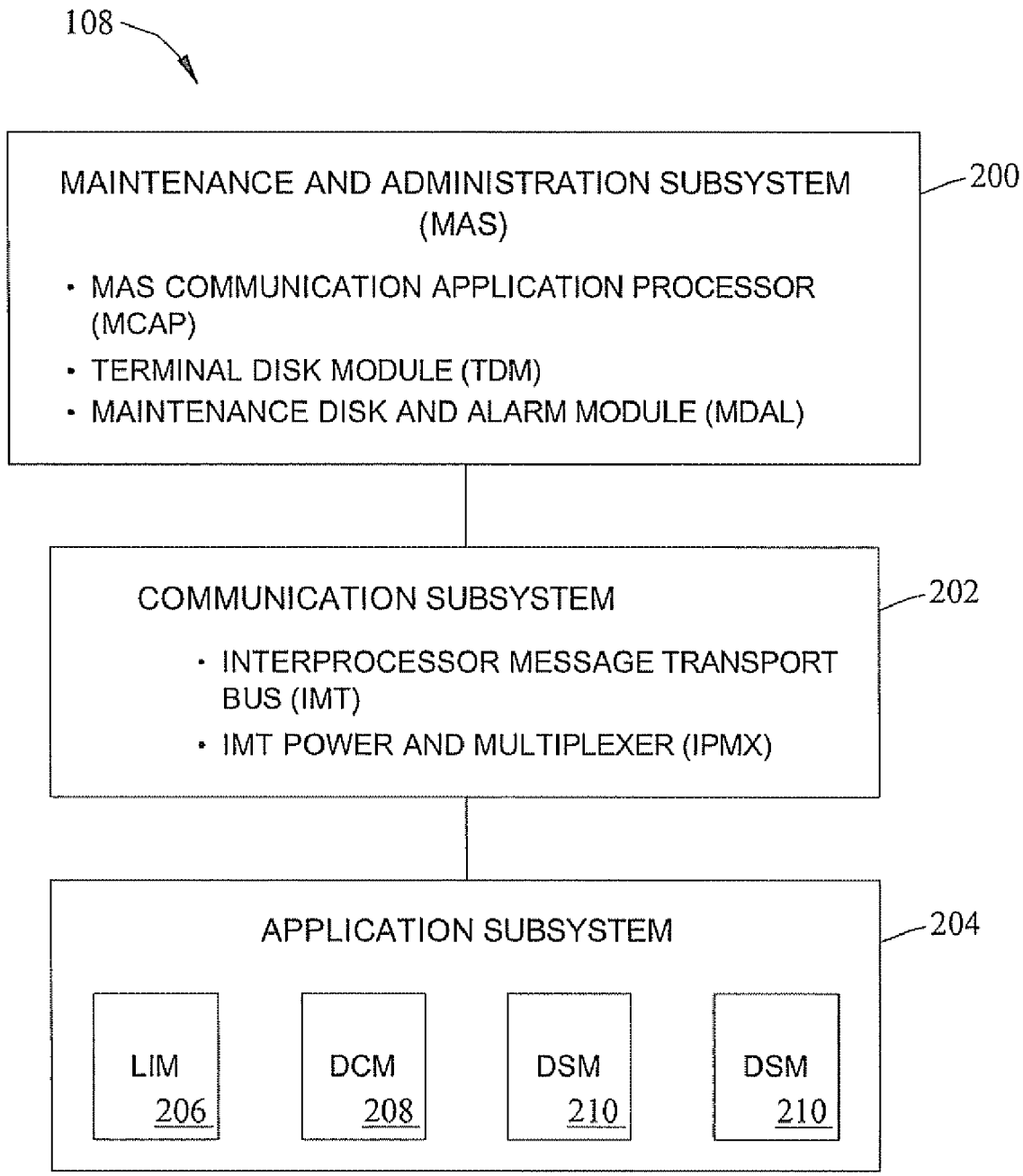
FIG. 2A is a block diagram of an exemplary telecommunications signaling message routing platform having a distributed internal processing architecture for providing message flow control between applications in the platform according to an embodiment of the subject matter described herein.

FIG. 2A illustrates exemplary internal subsystems of an STP to which the methods for providing message flow control according to the present subject matter may be applied. In the illustrated embodiment, STP 108 includes the following subsystems: a maintenance and administration subsystem (MAS) 200, a communication subsystem 202, and an application subsystem 204. Maintenance and administration subsystem 200 provides maintenance communications, initial program loading, peripheral services, provisioning capability, alarm processing, and system disks. Communication subsystem 202 includes an interprocessor message transport (IMT) bus that is the main communication bus among all of the subsystems in STP 108. In one embodiment, the IMT bus includes two 125 Mbps counter-rotating serial buses. In an alternate embodiment, a packet switch, such as an Ethernet switch, and an associated local area network (LAN) may be used in place of the IMT bus.

Application subsystem 204 includes numerous source and service cards that are capable of communicating with each other through the IMT bus. Examples of a source card include a link interface module (LIM) 206 that interfaces with SS7 and X.25 links and a data communications module (DCM) 208 that interfaces with SS7 over IP signaling links. Examples of a service card include database services modules (DSM) 210 that provide global title translation (GTT), number portability translation, or any other database-related service for received signaling messages. While multiple source and service cards may be simultaneously configured and operatively connected to the IMT bus, it is appreciated that, in one implementation, each card may be assigned a unique IMT bus address so as to generally facilitate the internal communication of messages between provisioned cards that are attached to the IMT bus. In a switch-based topology, each card may be coupled to a port of the switch and may have been identified by a MAC address.

Figure 2B:
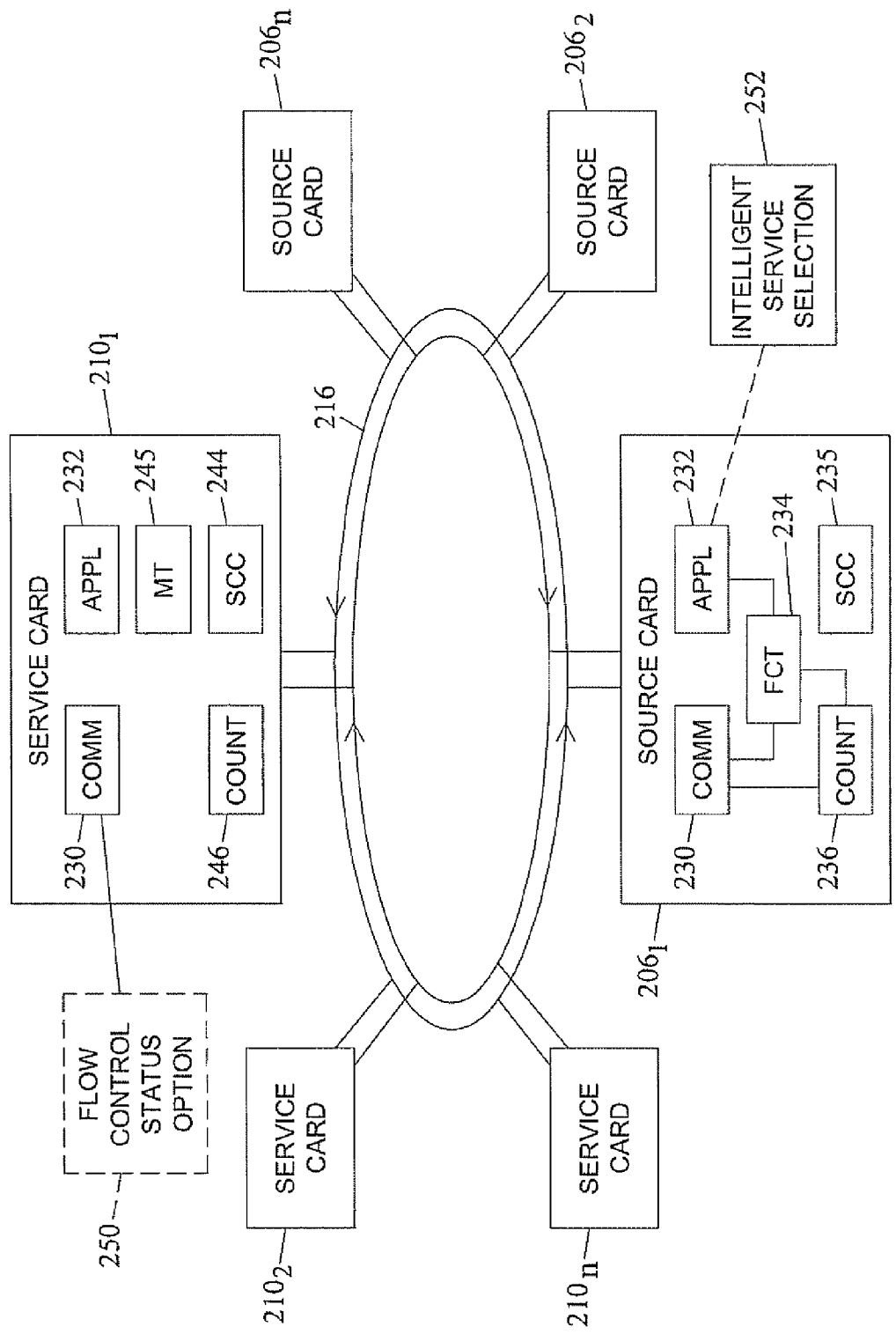
FIG. 2B is a block diagram of source and service cards communicating via an IMT bus within a telecommunications signaling message routing platform having a distributed internal processing architecture for providing message flow control between applications in the platform according to an embodiment of the subject matter described herein.

FIG. 2B is a block diagram that depicts portions of communications subsystem 202 and application subsystem 204 in greater detail. Specifically, FIG. 2B depicts an IMT bus 216, a plurality of source cards $206_{1...n}$, and a plurality of service cards $210_{1...m}$ belonging to exemplary STP 108.

In one embodiment, each of the plurality of source cards $206_{1...n}$ is connected to at least one signaling link (not shown) that is coupled to STP 108. Notably, STP 108 may be configured so that each incoming/outgoing signaling link interfaces a source card (although a given source card may be configured to support multiple signaling links).

In one embodiment, each of the plurality of source cards $206_{1...n}$ (e.g., source card $206_1$) includes a communications processor 230, an application processor 232, a flow control table 234, a system service counter 235, and a counter mechanism 236. Communications processor 230 may be a processor programmed to control communications over bus 216. Application processor 232 may execute various applications for processing received signaling messages. For example, on source cards $206_{1...n}$, application processors 232 may implement the SS7 protocol stack for routing SS7 signaling messages. In an embodiment in which a source card is an SS7 over IP card, application processor 232 may implement an SS7 over IP protocol stack. Application processor 232 on each service card 210 may execute applications for providing the particular services. As stated above, examples of such services typically provided by a signaling message routing node include global title translation, number portability translation, security screening, etc.

In order to provide flow control between service cards $210_{1...m}$ and source cards $206_{1...n}$, communications processor 230 on each service card may execute a flow control status update application 250 for communicating the flow control status of each service card $210_{1...m}$ to each source card $206_{1...n}$. In one implementation, flow control status update application 250 may send broadcast signaling units (BSUs) to source cards $206_{1...n}$ to communicate the flow control status of a service card to each of the source cards.

Communications processors 230 on each source card $206_{1...n}$ may receive the broadcast signaling units from service cards $210_{1...m}$ and store corresponding flow control status information in flow control tables 234. Flow control table 234 on each source card may maintain a real time view of the flow control status of each service card $210_{1...m}$. An intelligent service selection application 252 may execute on the application processor 232 of each source card to intelligently select a service card that is not in flow control state based on the information in flow control table 234.

In one implementation, flow control table 234 may include a local memory table that is shared by communications processor 230 and application processor 232 of each source card $206_{1...n}$. Flow control table 234 may include a plurality of fields, such as a "name field" that contains the name (i.e., identification number) of each of the plurality of service cards $210_{1...m}$, a "service field" for indicating the type(s) of service(s) that each service card provides, an "availability field" for indicating (e.g., a flag) whether a given service card is in a flow control state, and a "timer field" that indicates the time in which a given service card exits a flow control state (if applicable). In one embodiment, a counter mechanism 236 keeps track of a timer value in the timer field. For example, after receiving a BSU message that indicates a service card has entered a flow control state as well as the duration of the flow control state, communications processor 232 of the receiving source card enters this information in flow control table 234 (e.g., removing a "flag" from the availability field and inserting the flow control expiration time in the timer field associated with the service card question) and utilizes counter mechanism 236 to keep track of the expiration of the flow control duration. In one embodiment, counter mechanism 236 may be adapted to monitor multiple durations associated with several service cards. Upon the expiration of the flow control duration, communications processor 232 is adapted to update the service card's status in flow control table 234 by removing the indication of flow control from the "availability" field and clearing the timer field.

In the illustrated example, IMT bus 216 is the main communications bus utilized by the plurality of source and service cards in STP 108. In one embodiment, IMT bus 216 includes two 125 Mbps counter rotating serial rings. Communications processor 230 on each source card may use IMT bus 216 to send received messages to a selected service card 204. Likewise, service cards $210_{1...m}$ utilize IMT bus 216 to send broadcast signal unit (BSU) messages to source cards $206_{1...n}$ in the event a service card enters a flow control state. Specifically, the BSU message may be used to broadcast flow control state and duration information to be used to update flow control tables 234 on source cards $206_{1...n}$. In one embodiment, the present subject matter may be implemented using an Ethernet where cards $206_{1...n}$ and $210_{1...m}$ are arranged in a star topology afforded by IMT bus 216.

Figure 3:
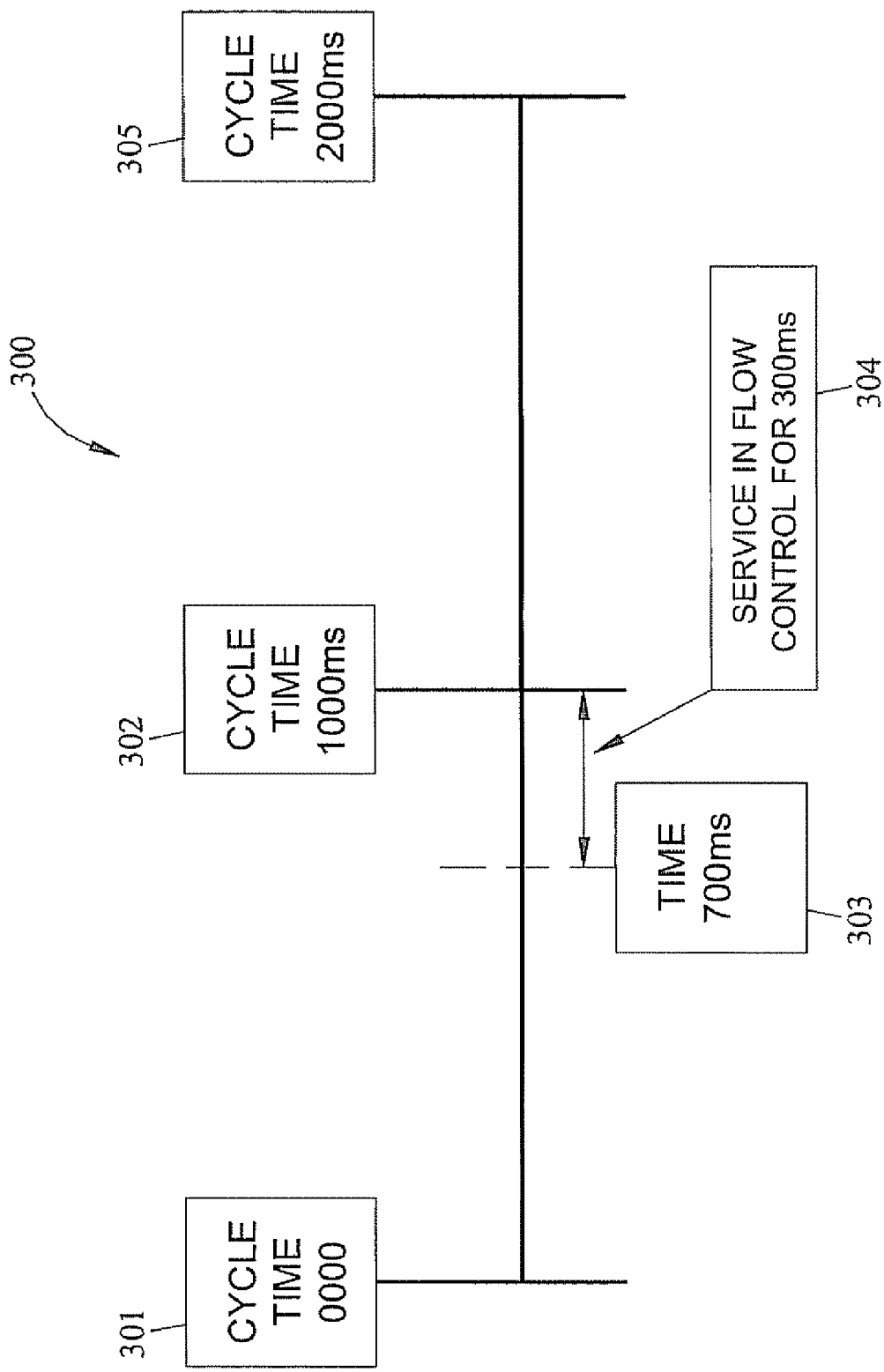
FIG. 3 is a flow chart illustrating exemplary steps providing message flow control in a telecommunications signaling message routing platform having a distributed internal processing architecture according to an embodiment of the subject matter described herein.

In one embodiment, each of service cards $210_{1...m}$ is coupled to IMT bus 216. Each of the plurality of service cards $210_{1...m}$ contains a communications processor 230, an applications processor 232, a shared memory table 245, a system service counter 244 and a counter mechanism 246. Each service card $210_{1...m}$ may be capable of supporting a plurality of services, such as GTT, number portability translation, and the like. Each service card $210_{1...m}$ may also rate the processing capacity required to provide each service. In one embodiment, a transaction rating may be maintained for each service type. The transaction rating for each service represents the number of service request messages of each type that may be processed by service card $210_1$ during a process cycle (e.g., process 500 GTT request messages in 1000 ms time period). A process cycle may be defined as a "window", or time period, in which only a predetermined number of transactions (e.g., service request messages) may be processed by a service card for a given service. In one embodiment, if a service card receives more messages requesting service than the number specified by the transaction rating for a given service, then the service card enters a flow control state. To illustrate, FIG. 3 depicts a time line 300 for which a particular service on a service card $210_1$ is executed. Referring to FIG. 3, a service (e.g., number portability translation service) on a service card $210_1$ may include a transaction rating that allows 500 service request messages per process cycle. Similarly, service card $210_1$ may be rated to function in accordance with a 1000 ms process cycle "window" as indicated by block 302. In this scenario, service card $210_1$ is capable of receiving up to 500 number portability related messages per 1000 ms. Upon receiving the $500^{th}$ message at the 700 ms point (as indicated by block 303, for example), service card $210_1$ initiates a process whereby the entire service card $210_1$ enters a flow control state since service card $210_1$ reached the maximum number of messages for a given service during the allotted window time frame. The remaining portion of time in the process cycle (e.g., 300 ms, see component 304) in the window may then be placed in a BSU message by communications processor 240 and broadcasted to all source cards $206_1 \ldots _n$ via IMT bus 216. This remaining time period represents the duration in which service card $210_1$ will remain in a flow control state.

The above scenario illustrates a single service being supported by service card $210_1$ for the sake of clarity. However, as mentioned previously, service card $210_1$ may be configured to support a plurality of services, each with its own transaction rating. In the case where only one service is supported by the service card, a transaction rating may include the maximum number of transactions (i.e., service request messages) a service card may process for that service during a process cycle window. Because service cards are capable of supporting many services, each service supported by service card $210_1$ may be weighted based on the maximum capacity of the service card. For example, suppose a service card supports two services, service A and service B. In this scenario, service A may initially be rated for 1000 messages while service B may be rated to receive 2000 messages in a 1000 ms process cycle window. To determine an appropriate weighting factor, the service with the largest transaction rating is determined and a weighting factor is applied to each of the other services. In this case, service B's transaction rating of 2000 messages is the largest rating amongst all the services supported by the service card. Because the transaction rating of service B is twice as large as the transaction rating of service A, each message received by service A is modified by a weighting factor of 2 (e.g., 2000/1000=2). Therefore, every message received by service A is modified with the weighting factor so that each message is counted as 2. By using weighting factors, any supported service may then be allowed to have access to 100% of the service card's resources instead of dedicating an allotted portion of the service card's processing power to each service. Because the flow for each service during a given process cycle window may be irregular with respect to the other supported services, the latter scenario fails to utilize a considerable amount of the service card's processing resources.

Communications processor 230 is responsible for the initiation of all BSU messages originating from service card $210_1$. In one embodiment, communications processor 230 operates on the direction of applications processor 232 through parameters set in shared memory table 245. In one example, shared memory table 245 may resemble the following:

```
struct s_c-mfc_param_table
{
    t_u32    c-flow_control_time_in_ms;
    t_u32    card_fc_rate ;
    t_u32    comm_to_appl_fc_time ;
    t_u32    service_1_fc_rate;
    t_u32    service_2_fc_rate;
    t_u32    service_3_fc_rate;
    t_u32    service_4_fc_rate;
    t_u32    service_5_fc_rate;
    t_u32    service_6_fc_rate;
    t_u32    service_7_fc_rate;
    t_u32    service_8_fc_max_queue_depth;
};
typedef struct s_c-mfc_param_table  t_c-mfc_param_table;
```

As represented above, shared memory table 245 includes a "c-flow_control_time_in_ms" field, which may contain a timer value used for all services (e.g., services 1-7) provided by service card $210_1$. In one embodiment, this field may contain the remaining window duration depicted in block 304 of FIG. 3. For example, when the timer value includes a non-zero value, it may indicate that BSU messages are to be broadcasted to indicate a flow control state on service card $210_1$. Notably, a non-zero value in this field expressed in milliseconds (ms) defines the remaining cycle time that will be used to clear all local services on the service card (e.g., set them out-of-flow-control). Alternatively, a timer value set to 0000 may be used to indicate that service card $210_1$ will not issue flow control BSU messages (i.e., the service card is not in a flow control state). In one embodiment, counter mechanism 246 may be used to keep track of the time value in c-flow_control_time_in_ms. Each time counter mechanism 246 indicates the end of a cycle (e.g., once every 1000 ms), entries in shared memory table 245 on service card $210_1$ are set to indicate "out of flow control."

Shared memory table 245 may also include a "card_fc_rate" field. This field includes a predefined threshold that indicates the number of system messages (e.g., network management messages). In one embodiment, communications processor 240 counts all system messages being delivered to applications processor 232. If the total number of received messages reaches the card_fc_rate threshold, communications processor 232 updates the local shared memory table 245 by placing all local services associated with the service card into flow control. Communications processor 232 subsequently launches a BSU message to update all the source and service cards within STP 108 with information indicating that service card $210_1$ is presently in a flow control state.

Shared memory table 245 also includes a plurality of "service_(1-7)_fc_rate" counters. Each of these seven counters represents a service on service card 230 and a unique transaction rating for each service. For example, service card $210_1$ may be rated for 1000 GTT transactions (service 1) and 2000 number portability transactions (service 2) (in this example, services 3-7 are rated zero since they are unused). Communications processor 230 monitors each message that is routed to service card $210_1$ by counting the total number of message requests per service. When the total allowable number of message requests received for a particular service is exceeded, communications processor 230 updates memory table 245 and launches a BSU message to update the source and service cards with information indicating that service card $210_1$ is in a flow control state.

In one embodiment, the $8^{th}$ "local service", "service_8_fc_max_queue_depth", includes a special meaning that may be consistent on all service cards. Notably, the $8^{th}$ service reflects the state of congestion for the communications processor-to-applications processor queue. If the communications processor-to-applications processor queue reaches a depth configured via the $8^{th}$ local service, then shared memory table 245 is updated by marking all services in a flow control state, including the $8^{th}$ service. In addition, a BSU message that reflects that all local services (including the $8^{th}$ service) are in a state of flow control is launched.

This configuration provides the application a bit more data when it detects that a service on service card is in a flow control state and the $8^{th}$ service is also in flow control. When this occurs, the application knows that the destination service more than likely did not reach its maximum capacity, but rather the communications processor-to-applications processor queue backed up. Flow control still functions, but with this added information, a system engineer may be able to tune STP 108 to avoid communications processor-to-applications processor queue congestion in the future.

In the event service card $210_1$ enters a state of flow control, communications processor 230 broadcasts a BSU message over IMT bus 216 to all of the remaining source and service cards.

In one embodiment, the BSU message received by each source card may be characterized as having three fields of data. The first field defines the BSU message as a "card level" BSU (e.g., a BSU message associated with a service card on an STP). The second field may contain data for an entry in flow control table 234 that indicates the sending service card is in a flow control state. In one embodiment, the data may be indexed by the address of the sending service card. The third field in the BSU message may contain either the flow control state expiration time or the amount of time that the service card is to remain in a flow control state (e.g., see block 304 in FIG. 3). In one embodiment, this data may be stored in flow control table 234 on each source card 202 and may be kept track of by counter mechanism 236. Each receiving source card 202 is responsible for clearing the flow control (i.e., unavailability) status of its local copy of the service card entry in table 234 once the flow control state duration time originally specified in the BSU message expires (as indicated by each respective counter 236).

Figure 4:
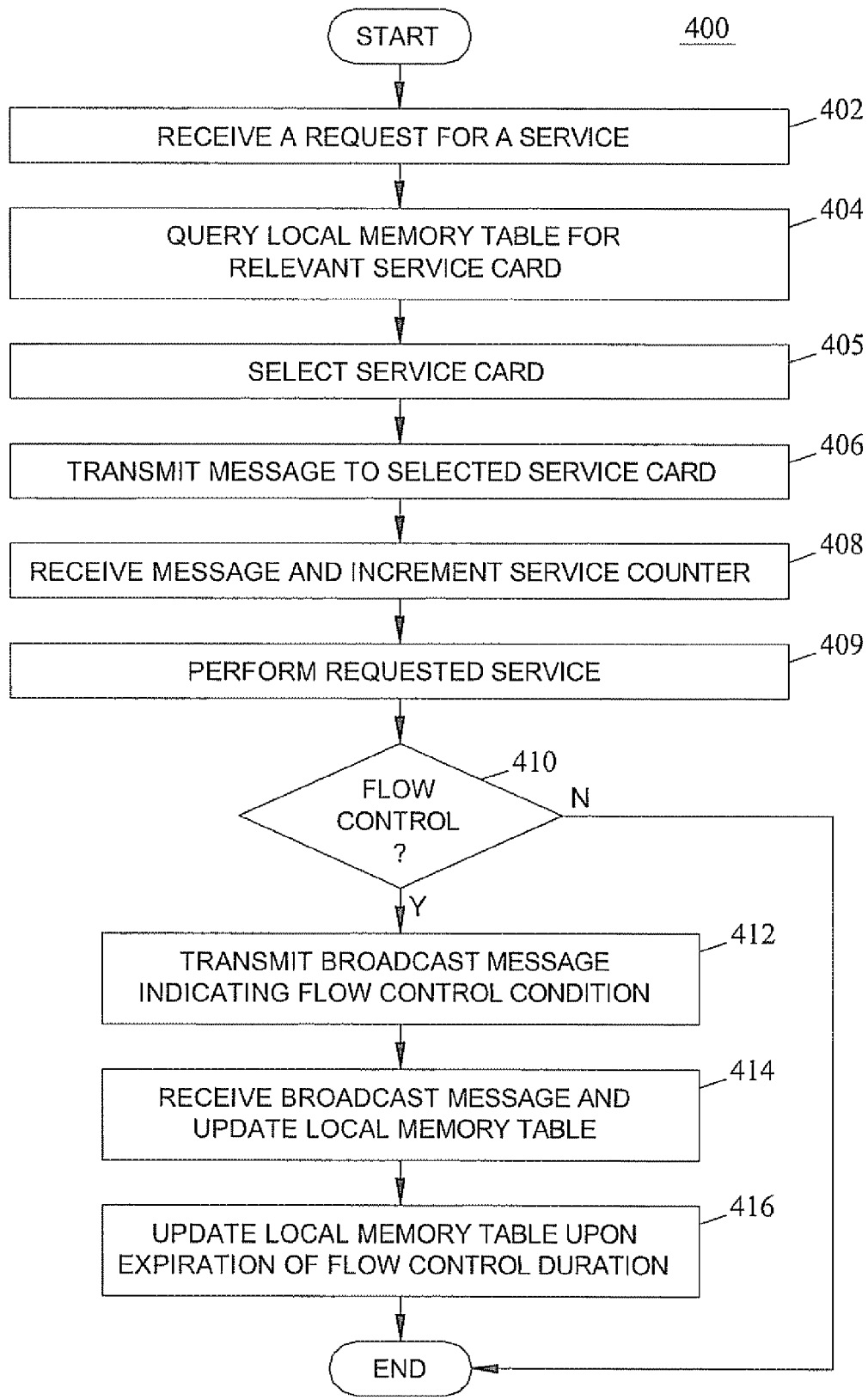
FIG. 4 is an exemplary timeline depicting time boundaries associated with message flow control according to an embodiment of the subject matter described herein.

FIG. 4 is a flow chart illustrating the exemplary steps of a method 400 for providing flow control according to an embodiment of the subject matter described herein. In one embodiment, method 400 may be implemented using a computer program product including computer executable instructions embodied in a computer readable medium executed by a processor.

In block 402, a request message for a service is received. In one embodiment, a source card $206_1$ (e.g., a LIM module) belonging to a plurality of source cards $206_{1...n}$ supported by STP 108 (or any other signaling message routing platform having a distributed internal processing architecture) receives a message requiring a particular service. For example, STP 108 may receive a request message originating from network 100 at a LIM module via a signaling link (not shown).

In block 404, a local memory table is queried for a relevant service card. In one embodiment, source card $206_1$ uses application processor 232 to query a local memory table (e.g., local flow control table 234) in order to select a service card capable of performing the requested service indicated in the received service request message. Local flow control table 234 may include a list of service cards contained in STP 108 (e.g., connected to IMT bus 216) along with data pertaining to the types of services each service card is capable of providing. Local flow control table 234 also includes information regarding the "availability" of each service card (e.g., data indicating the corresponding flow control status of each service card).

In block 405, an appropriate service card is selected. In one embodiment, source card $206_1$ uses application processor 232 to select a service card (e.g., service card $210_1$) from a list of "available" service cards contained in local flow control table 234. The manner in which source card $206_1$ selects an appropriate service card (i.e., a service card that is both capable and available to perform the requested service) is not important so long as the selection is performed intelligently. For example, source card $206_1$ may inspect local flow control table 234 to determine if any relevant service cards are proximately located (e.g., on the same shelf as source card $206_1$).

In block 406, a message is transmitted to the selected service card. In one embodiment, after selecting service card $210_1$, source card $206_1$ may use communications processor 230 to transmit a service request message to service card $210_1$ (which has an available flow control status) in order instruct the service card to handle the requested service.

In block 408, the service request message is received and a service counter is incremented. In one embodiment, service card $210_1$ receives the service request message from source card $206_1$ and increments a local service counter 248 by one. Local service counter 248 is responsible for keeping a record of the number of received service request messages for each service provided by service card $210_1$.

In block 409, the requested service is performed normally.

In block 410, a determination is made as to whether the service card is operating in a flow control state. In one embodiment, service card $210_1$ makes a comparison between local service counter 248 and a predefined threshold number that represents the maximum number of transactions that may be received by the selected service (in a given time window) before a flow control condition is initiated. If local service counter 248 exceeds the threshold number (for the given time window), the assigned task may still be performed, but service card $210_1$ initiates a flow control process in block 412. Otherwise, method 400 ends.

In block 412, a broadcast message indicating a flow control state is transmitted. In one embodiment, communications processor 230 on service card $210_1$ transmits a broadcast signaling unit (BSU) message to all source cards $206_{1...n}$ contained in STP 108 via IMT bus 216 (as well as performing the requested service in parallel). The BSU message may be used to inform each source card 206 that service card $210_1$ is in a flow control state and cannot process any further requests for a designated time. The duration of the designated time of the flow control state may also be included in the BSU message. For example, the amount of time remaining in the process cycle window (e.g., see 304 in FIG. 3) may be included in the BSU message since it represents when the flow control state expires as well as the amount of time before a new process cycle window is initiated.

In block 414, the broadcast message is received and the local memory table is updated. In one embodiment, each source card 206 on IMT bus 216 receives the BSU sent by service card 210. Upon receiving the BSU, each source card 206 updates its respective local flow control table 234 to indicate that service card $210_1$ is in a flow control state for a specified duration and is unavailable. During this time period, the source card 206 does not send any service request messages to service card $210_1$ due to its "unavailability." In one embodiment, each source card 202 maintains a counting mechanism 236 that keeps track of the service card's remaining flow control duration, which was indicated/contained in the received BSU message.

In block 416, the local memory table is updated upon the expiration of the flow control duration. In one embodiment, each source card 206 updates its local flow control table 234 upon the expiration of the flow control duration, as indicated by counter mechanism 236. For example, if the service card 210 originally indicated that the specified flow control duration is 300 ms (see block 412) in the BSU message, then local flow control table 234 of each source card 206 removes the "unavailable" status from its respective entry of service card 210 upon the expiration of 300 ms (from the point of receiving the original BSU message) on counter mechanism 236. In another embodiment, service card 210 may send a subsequent BSU message to all of the source cards $206_{1...n}$ that service card 210 is no longer in a flow control state.

In one embodiment, the present subject matter may also be used to utilize flow control on a system level. System level flow control may be used to manage system level resources. One example may include network management. Within STP 108 at any time, any SS7 port may be called upon to update an SS7 network status. Notably, there is a limit within STP 108 as to the number of network updates can be handled on a per second basis. By using system level flow control, service such as SS7 network management may be managed to an engineered level. For example, each of the plurality of source cards 206 and each of the plurality of service cards 210 include a service system counter (SSC) (e.g., SSC 235 and SSC 244, respectively) to keep track of the number of system-level messages that traverse the network during a given time period (e.g., 2000 system messages per second). An exemplary service system-level message may include a network management message. For example, source cards 206 and service cards 210 may receive a multicast network management message from another network node in system 100. Upon receiving the system-level service message, a receiving source card 206 updates its own SSC 235 by incrementing the count by 1. Source card 206 then sends a system-level service message to the remaining plurality of source cards and service cards to update their respective SSCs. In the event the value contained by SSC 235 (or SCC 244) exceeds a predefined threshold (e.g., 2000 system messages per second), then a system-wide (e.g., STP wide) flow control state is initiated. Specifically, the first source or service card to achieve saturation may broadcast a message to instruct the remaining cards to enter a system wide flow control state where the system-level messages are not received.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing message flow control between applications in a telecommunications signaling message routing platform having a distributed internal processing architecture, the method comprising:
   receiving, at a source card in a signaling message routing platform having a distributed internal processing architecture, a message requiring a service;
   maintaining, on the source card, a local memory table containing a list of service cards and corresponding flow control status of each service card;
   querying the local memory table to select a service card capable of performing the service; and
   transmitting the message to one of the service cards with an available flow control status.

2. The method of claim 1 comprising continually transmitting flow control status update messages from each of the service cards for updating the flow control status of each service card at the source card.

3. The method of claim 2 wherein continually transmitting the flow control status update messages includes broadcasting the flow control status update messages to a plurality of source cards in the signaling message routing platform.

4. The method of claim 2 wherein the flow control status update messages that indicate that a source card is in a flow control state include an expiration time for the flow control state and wherein the source card updates the flow control status of a corresponding service card in response to the expiration time being reached.

5. The method of claim 1 wherein the plurality of service cards and the plurality of source cards are communicatively connected via a bus having a ring topology.

6. The method of claim 1 wherein the plurality of service cards and the plurality of source cards are communicatively connected via a packet switch.

7. The method of claim 1 comprising, at the selected service card, receiving the message, providing the service, and routing the message to a destination.

8. The method of claim 7 wherein proving the service comprises providing global title translation service.

9. The method of claim 7 comprising, at the selected service card, determining whether the providing of the service would place the service card in a flow control state, and, in response to determine that the process would place the service card in the flow control state, sending a flow control status update message indicating that the service card is in the flow control state.

10. The method of claim 9 wherein determining whether the providing of the service would place the card in the flow control state includes weighting the service according to its service type.

11. The method of claim 1 comprising, at the selected service card, receiving the message providing the selected service, terminating the message, and formulating and sending a response to the message.

12. The method of claim 11 wherein providing the service comprises providing number portability translation service.

13. The method of claim 3, wherein the plurality of source cards and the service cards collectively enter a system flow control state in response to an event which would cause a number of system-level messages required to be processed by any of the cards to exceed a predefined message threshold.

14. A system for providing message flow control between applications in a telecommunications signaling message routing platform having a distributed internal processing architecture, the signal transfer point comprising:
   a source card belonging to a plurality of source cards for receiving a message requiring a service, maintaining a local memory table containing a list of service cards and corresponding flow control status of each service card, querying the local memory table to select a service card capable of performing the service, and transmitting the message to one of the service cards with an available flow control status; and
   a service card belonging to the plurality of service cards for receiving the message.

15. The system of claim 14 wherein each of the plurality of service cards is adapted to continually transmit flow control status update messages for updating the flow control status of each service card at the source card.

16. The system of claim 15 wherein each of the plurality of service cards is adapted to broadcast the flow control status update messages to the plurality of source cards in the telecommunications signaling message routing platform.

17. The system of claim 15 wherein the flow control status update messages that indicate that a source card is in a flow control state include an expiration time for the flow control state and wherein the source card updates the flow control status of a corresponding service card in response to the expiration time being reached.

18. The system of claim 14 wherein the plurality of service cards and the plurality of source cards are communicatively connected via a bus having a ring topology.

19. The system of claim 14 wherein the plurality of service cards and the plurality of source cards are communicatively connected via a packet switch.

20. The system of claim 14 wherein the selected service card is adapted to receive the message, provide the service, and route the message to a destination.

21. The system of claim 20 wherein the selected service card is adapted to determine whether the providing of the service would place the service card in a flow control state, and, in response to determining that the process would place the service card in the flow control state, sending a flow control status update message indicating that the service card is in the flow control state.

22. The system of claim 21 wherein the selected service card is adapted to weight the service according to its service type.

23. The system of claim 14 wherein the service card is adapted to provide one of global traffic and number portability translation service.

24. The system of claim 14 wherein the plurality of source cards and the service cards collectively enter a system flow control state in response to an event which would cause a number of system-level messages required to be processed by any of the cards to exceed a predefined message threshold.

25. A computer program product comprising computer executable instructions embodied in a computer readable medium for performing steps comprising:
- receiving, at a source card in a signaling message routing platform having a distributed internal processing architecture, a message requiring a service;
- maintaining, on the source card, a local memory table containing a list of service cards and corresponding flow control status of each service card;
- querying the local memory table to select a service card capable of performing the service; and
- transmitting the message to one of the service cards with an available flow control status.

* * * * *